United States Patent
Molina-Markham et al.

(10) Patent No.: US 9,961,547 B1
(45) Date of Patent: May 1, 2018

(54) CONTINUOUS SEAMLESS MOBILE DEVICE AUTHENTICATION USING A SEPARATE ELECTRONIC WEARABLE APPARATUS

(71) Applicants: EMC IP Holding Company LLC, Hopkinton, MA (US); The Trustees of Dartmouth College, Hanover, NH (US)

(72) Inventors: Andres D. Molina-Markham, Woburn, MA (US); Shrirang Mare, West Lebanon, NH (US); Ronald Peterson, Jr., Brattleboro, VT (US); David Kotz, Lyme, NH (US)

(73) Assignees: EMC IP Holding Company LLC, Hopkinton, MA (US); The Trustees of Dartmouth College, Hanover, NH (US)

( * ) Notice: Subject to any disclaimer, the term of this patent is extended or adjusted under 35 U.S.C. 154(b) by 0 days. days.

(21) Appl. No.: 15/281,694

(22) Filed: Sep. 30, 2016

(51) Int. Cl.
*H04W 12/06* (2009.01)
*H04W 4/00* (2018.01)
*H04L 29/08* (2006.01)
*G06F 17/30* (2006.01)

(52) U.S. Cl.
CPC ........ *H04W 12/06* (2013.01); *G06F 17/3053* (2013.01); *H04L 67/22* (2013.01); *H04W 4/008* (2013.01)

(58) Field of Classification Search
CPC ...... H04W 12/06; H04W 4/0088; H04L 67/22
See application file for complete search history.

(56) References Cited

U.S. PATENT DOCUMENTS

| | | | |
|---|---|---|---|
| 9,319,419 B2 * | 4/2016 | Sprague | ............... H04L 63/126 |
| 2003/0103414 A1 | 6/2003 | Lyon | |
| 2007/0177770 A1 | 8/2007 | Derchak et al. | |
| 2012/0317024 A1 | 12/2012 | Rahman et al. | |

(Continued)

FOREIGN PATENT DOCUMENTS

WO      2014153528 A3      9/2014

OTHER PUBLICATIONS

A. A. E. Ahmed and I. Traore. A new biometric technology based on mouse dynamics. IEEE Transactions on Dependable and Secure Computing, 4(3):165-179, 2007.

(Continued)

*Primary Examiner* — Asghar Bilgrami
(74) *Attorney, Agent, or Firm* — BainwoodHuang

(57) ABSTRACT

A technique performs a security operation. The technique includes receiving first activity data from a mobile device, the first activity data identifying activity by a user that is currently using the mobile device. The technique further includes receiving second activity data from an electronic wearable apparatus, the second activity data identifying physical activity by a wearer that is currently wearing the electronic wearable apparatus. The technique further includes, based on the first activity data received from the mobile device and the second activity data received from the electronic wearable apparatus, performing an assessment operation that provides an assessment result indicating whether the user that is currently using the mobile device and the wearer that is currently wearing the electronic wearable apparatus are the same person. With such a technique, authentication may be continuous but without burdening the user to repeatedly re-enter a password.

20 Claims, 7 Drawing Sheets

(56) References Cited

U.S. PATENT DOCUMENTS

| | | | |
|---|---|---|---|
| 2013/0027341 A1 | 1/2013 | Mastandrea | |
| 2016/0098710 A1* | 4/2016 | Suen | G06Q 20/382 705/44 |
| 2016/0182496 A1* | 6/2016 | Weast | H04L 63/0853 726/3 |
| 2017/0035327 A1* | 2/2017 | Yuen | G06F 3/017 |

OTHER PUBLICATIONS

P. S. Aleksic and A. K. Katsaggelos. Audio-visual biometrics. Proceedings of the IEEE, 94(11):2025-2044, Nov. 2006. DOI 10.1109/JPROC.2006.886017.
Face Unlock on Android 4.0. Online at http://www.huffingtonpost.com/2011/10/19/face-unlock-ice-cream-sandwich n 1020207.html.
Android Wear. Online at http://www.android.com/wear/, visited May 2015.
Apple iPhone, http://www.apple.com/iphone/, visited May 2015.
Apple Watch. Online at http://www.apple.com/watch/, visited May 2015.
S. S. Arora, K. Cao, A. K. Jain, and N. G. Paulter. 3D fingerprint phantoms. In Proceedings of the International Conference on Pattern Recognition (ICPR), pp. 684-689. IEEE, 2014.
A. J. Aviv, K. Gibson, E. Mossop, M. Blaze, and J. M. Smith. Smudge attacks on smartphone touch screens. In Proceedings of the USENIX Conference on Offensive Technologies, pp. 1-7. USENIX Association, 2010.
F. Bergadano, D. Gunetti, and C. Picardi. User authentication through keystroke dynamics. ACM Transactions on Information Systems and Security (TISSEC), 5(4):367-397, Nov. 2002.
N. Bilton. Keeping your car safe from electronic thieves. Online at http://www.nytimes.com/2015/04/16/style/keeping-your-car-safe-from-electronic-thieves.html, visited Apr. 2015.
C. Bo, L. Zhang, X.-Y. Li, Q. Huang, and Y. Wang. SilentSense: Silent user identification via touch and movement behavioral biometrics. In Proceedings of the International Conference on Mobile Computing and Networking (MobiCom), pp. 187-190, 2013. DOI 10.1145/2500423.2504572.
J. Bonneau, C. Herley, P. C. van Oorschot, and F. Stajano. The quest to replace passwords: A framework for comparative evaluation of web authentication schemes. In IEEE Symposium on Security and Privacy, pp. 553-567, May 2012. DOI 10.1109/SP.2012.44.
C. Cornelius, R. Peterson, J. Skinner, R. Halter, and D. Kotz. A wearable system that knows who wears it. In Proceedings of the International Conference on Mobile Systems, Applications, and Services (MobiSys), pp. 55-67, Jun. 2014. DOI 10.1145/2594368.2594369.
M. D. Corner and B. D. Noble. Protecting applications with transient authentication. In Proceedings of the International Conference on Mobile Systems, Applications, and Services (MobiSys), pp. 57-70, 2003. DOI 10.1145/1066116.1066117.
T. Feng, J. Yang, Z. Yan, E. M. Tapia, and W. Shi. TIPS: Context-aware implicit user identification using touch screen in uncontrolled environments. In Proceedings of the Workshop on Mobile Computing Systems and Applications (HotMobile), pp. 9:1-9:6. ACM, 2014. DOI 10.1145/2565585.2565592.
T. Feng, X. Zhao, B. Carbunar, and W. Shi. Continuous mobile authentication using virtual key typing biometrics. In Proceedings of the 12th IEEE International Conference on Trust, Security and Privacy in Computing and Communications (IEEE TrustCom). IEEE, 2013.
FitBit. Online at http://www.fitbit.com, visited May 2015.
M. Frank, R. Biedert, E. Ma, I. Martinovic, and D. Song. Touchalytics: On the applicability of touchscreen input as a behavioral biometric for continuous authentication. IEEE Transactions on Information Forensics and Security, 8(1):136-148, 2013.
Jawbone UP. Online at https://jawbone.com/up, visited Dec. 2015.

H. Khan, A. Atwater, and U. Hengartner. A comparative evaluation of implicit authentication schemes. In Proceedings of the 17th International Symposium on Research in Attacks, Intrusions and Defenses, 2014.
A. Kumar, N. Saxena, G. Tsudik, and E. Uzun. A comparative study of secure device pairing methods. Pervasive and Mobile Computing, 5(6):734-749, 2009. DOI 10.1016/j.pmcj.2009.07.008.
C. E. Landwehr. Protecting unattended computers without software. In Proceedings of the Annual Computer Security Applications Conference (ACSAC), pp. 274-285, 1997. Online at http://dl.acm.org/citation.cfm?id=872015.872112.
L. Li, X. Zhao, and G. Xue. Unobservable re-authentication for smartphones. In Proceedings of the Network and Distributed Systems Security Symposium (NDSS), 2012.
J. Liu, L. Zhong, J. Wickramasuriya, and V. Vasudevan. uwave: Accelerometer-based personalized gesture recognition and its applications. Pervasive and Mobile Computing, 5(6):657-675, Dec. 2009. DOI 10.1016/j.pmcj.2009.07.007.
Lookout Mobile mindset study. Online at https://www.lookout.com/resources/reports/mobile-mindset, visited Jun. 2012.
Survey reveals consumers exhibit risky behaviors despite valuing their privacy on mobile devices. Online at https://www.lookout.com/news-mobile-security/sprint-lookout-mobile-privacy-survey, visited 2013.
F. Maggi, A. Volpatto, S. Gasparini, G. Boracchi, and S. Zanero. A fast eavesdropping attack against touchscreens. In Proceedings of the International Conference on Information Assurance and Security (IAS), pp. 320-325, Dec. 2011. DOI 10.1109/ISIAS.2011.6122840.
S. Mare, A. Molina-Markham, C. Cornelius, R. Peterson, and D. Kotz. ZEBRA: Zero-effort bilateral recurring authentication. In Proceedings of the IEEE Symposium on Security and Drivacy (S&P), pp. 705-720, May 2014. This project has been renamed BRACE, DOI 10.1109/SP.2014.51.
Misfit. Online at http://misfit.com, visited May 2015.
N. Neverova, C. Wolf, G.Lacey, L. Fridman, D. Chandra, B. Barbello, and G. Taylor. Learning human identity from motion patterns. arXiv preprint arXiv:1511.03908, 2015.
Pebble. Online at https://getpebble.com, visited May 2015.
A. Ross, J. Shah, and A. K. Jain. From template to image: Reconstructing fingerprints from minutiae points. IEEE Transactions on Pattern Analysis and Machine Intelligence, 29(4):544-560, Apr. 2007. DOI 10.1109/TPAMI.2007.1018.
A. Serwadda and V. V. Phoha. When kids' toys breach mobile phone security. In Proceedings of the ACM Conference on Computer and Communications Security (CCS), pp. 599-610, 2013. DOI 10.1145/2508859.2516659.
Shimmer Research. Last visited Aug. 2016, Online at http://www.shimmersensing.com, visited.
D. Shukla, R. Kumar, A. Serwadda, and V. V. Phoha. Beware, your hands reveal your secrets! In Proceedings of the ACM Conference on Computer and Communications Security (CCS), pp. 904-917, 2014. DOI 10.1145/2660267.2660360.
Android—5.0 Lollipop. Online at https://www.android.com/intl/en us/versions/lollipop-5-0/, visited Nov. 2015.
S. Sridhar, P. Misra, and J. Warrior. CheepSync: A time synchronization service for resource constrained Bluetooth low energy advertisers. CoRR, abs/1501.06479, Jan. 2015. Online at http://arxiv.org/abs/1501.06479.
A. Srivastava, M. Baker, J. Gummeson, and K.-H. Kim. Step-by-step detection of personally collocated mobile devices. In Proceedings of the Workshop on Mobile Computing Systems and Applications (HotMobile), 2015. DOI 10.1145/2699343.2699367.
F. Stajano. Pico: No more passwords! In B. Christianson, B. Crispo, J. Malcolm, and F. Stajano, editors, Security Protocols XIX, vol. 7114 of Lecture Notes in Computer Science, pp. 19-81. Springer-Verlag Berlin, Mar. 2011. DOI 10.1007/978-3-642-25867-1 6.
Q. Yue, Z. Ling, X. Fu, B. Liu, K. Ren, and W. Zhao. Blind recognition of touched keys on mobile devices. In Proceedings of the ACM Conference on Computer and Communications Security (CCS), pp. 1403-1414, 2014. DOI 10.1145/2660267.2660288.
Q. Yue, Z. Z Ling, X. Fu B. Liu, W. Yu, and W. Zhao. My Google Glass sees your passwords!, 2014.

(56) References Cited

OTHER PUBLICATIONS

Y. Zhang, P. Xia, J. Luo, Z. Ling, B. Liu, and X. Fu. Fingerprint attack against touch-enabled Devices. In Proceedings of the ACM workshop on Security and Privacy in Smartphones and Mobile Devices, pp. 57-68. ACM, 2012.

R. Zhou and G. Xing. nShield: A noninvasive NFC security system for mobile devices. In Proceedings of the International Conference on Mobile Systems, Applications, and Services (MobiSys), pp. 95-108, 2014. DOI 10.1145/2594368.2594376.

\* cited by examiner

CONTINUOUS SEAMLESS MOBILE DEVICE AUTHENTICATION USING A SEPARATE ELECTRONIC WEARABLE APPARATUS

GOVERNMENT LICENSE RIGHTS STATEMENT

This invention was made with government support under CNS-1329686 awarded by the National Science Foundation. The government has certain rights to the invention.

BACKGROUND

A conventional smartphone enables its user to access a variety of electronic resources. Examples of such resources includes a cellular telephone, messaging apps, a camera, the Internet, email, social media apps and games, among others.

To access such resources, the user typically authenticates by entering a password (e.g., a sequence of four numbers) on the touchscreen of the smartphone. If the entered password matches an expected password, the smartphone unlocks—thus enabling the user to access the resources. Additionally, the smartphone may re-lock after a period of smartphone inactivity, preventing further access to the resources.

SUMMARY

Unfortunately, there are deficiencies to the above-described conventional smartphone which simply authenticates a user by requiring the user to enter a password on the touchscreen. Along these lines, smartphone passwords such as sequences of four numbers provide relatively weak security (e.g., a malicious person can easily watch the legitimate user enter the correct password, the correct password can be easily guessed, the legitimate user often uses a relatively-weak easy-to-enter password such as 1-1-1-1 or 1-2-3-4, and so on).

Additionally, some users may disable the re-lock feature of the smartphone or configure the smartphone to re-lock only after a very long period of inactivity (e.g., 15 minutes, 30 minutes, an hour, etc.) because these users do not wish to be burdened with frequently entering their passwords. However, if a user puts down an unlocked smartphone that has the re-lock feature disabled or set for a very long period of inactivity before re-locking, a malicious person may be able to easily pick up the smartphone and access its resources.

In contrast to the above-described conventional smartphone which simply authenticates a user by requiring the user to enter a password on the touchscreen, improved techniques are directed to continuous seamless mobile device authentication using a separate electronic wearable apparatus. In particular, the legitimate user electronically pairs (e.g., configures, joins, enrolls, etc.) the mobile device and the electronic wearable apparatus to electronically communicate with and recognize each other. A comparison is then performed between activity of the mobile device and activity of the separate electronic wearable apparatus to determine whether such activity is from the same person. If the activity of the mobile device and the activity of the separate electronic wearable apparatus closely correlate, the current user of the mobile device and the current wearer of the electronic wearable apparatus are very likely the same person and successful authentication is achieved, as well as maintained. However, if the activity of the mobile device and the activity of the separate electronic wearable apparatus do not closely correlate, the current user of the mobile device and the current wearer of the electronic wearable apparatus are very likely different people (e.g., an unauthorized person that is not wearing the electronic wearable apparatus may have picked up the mobile device and attempted to access a protected resource via the mobile device) and thus further access is denied. Accordingly, there is robust and reliably security without the need for the user to continuously re-enter a password.

One embodiment is directed to a method of performing a security operation. The method includes receiving, by processing circuitry, first activity data from a mobile device, the first activity data identifying activity by a user that is currently using the mobile device (e.g., physical activity, user input or UI activity, etc.). The method further includes receiving, by the processing circuitry, second activity data from an electronic wearable apparatus, the second activity data identifying physical activity by a wearer that is currently wearing the electronic wearable apparatus. The method further includes, based on the first activity data received from the mobile device and the second activity data received from the electronic wearable apparatus, performing, by the processing circuitry, an assessment operation that provides an assessment result indicating whether the user that is currently using the mobile device and the wearer that is currently wearing the electronic wearable apparatus are the same person. With such a method, authentication may be continuous but without burdening the user to repeatedly re-enter a password.

In some arrangements, the mobile device is a smartphone (or a tablet device), and the user is currently using the smartphone. In these arrangements, the electronic wearable apparatus is a smart wrist-worn device (e.g., a smartwatch, an electronic step counter, a health pedometer or similar fitness band, etc.) and the wearer is currently wearing the smart wrist-worn device. Here, performing the assessment operation includes identifying an amount of correlation between the physical activity by the user and the physical activity by the wearer.

In some arrangements, the smartphone communicates with the smart wrist-worn device via short-range wireless communications. In these arrangements, receiving the second activity data from the electronic wearable apparatus includes acquiring the second activity data by the smartphone from the smart wrist-worn device via the short-range wireless communications.

In some arrangements, the processing circuitry resides within the smartphone. In these arrangements, the method further includes controlling, by the processing circuitry, access to a protected electronic resource which is accessible via the smartphone based on the amount of correlation between the physical activity by the user and the physical activity by the wearer.

In some arrangements, the processing circuitry resides within an external server which is remote from the smartphone and from the smart wrist-worn device. In these arrangements, the external server receives the second activity data from the smartphone after the smart phone acquires the second activity data from the smart wrist-worn device. Additionally, the method further includes controlling, by the processing circuitry, access to a protected electronic resource which is accessible via at least one of the smartphone and the smart wrist-worn device based on the amount of correlation between the physical activity by the user and the physical activity by the wearer.

In some arrangements, the smart wrist-worn device communicates with the smartphone via short-range wireless communications (e.g., Bluetooth, ANT, NFC, Zigbee, Wi-Fi, etc.). In these arrangements, receiving the first activity data from the smartphone includes acquiring the first activity data by the smart wrist-worn device from the smartphone via the short-range wireless communications.

In some arrangements, the processing circuitry resides within the smart wrist-worn device. In these arrangements, the method further includes controlling, by the processing circuitry, access to a protected electronic resource which is accessible via the smart wrist-worn device based on the amount of correlation between the physical activity by the user and the physical activity by the wearer.

In some arrangements, the processing circuitry includes confidence scoring circuitry. In these arrangements, identifying the amount of correlation between the physical activity by the user and the physical activity by the wearer includes providing, by the confidence scoring circuitry, a confidence score that indicates a numerical measure of confidence that the user and the wearer are the same person.

In some arrangements, the processing circuitry includes hand identification circuitry which is coupled to the confidence scoring circuitry. In these arrangements, identifying the amount of correlation between the physical activity by the user and the physical activity by the wearer further includes:
providing, by the hand identification circuitry, hand identification data to the confidence scoring circuitry, the hand identification data being based on the first activity data and the second activity data and indicating one of: (i) the smartphone and the smart wrist-worn device residing at the same hand of the same person, (i) the smartphone and the smart wrist-worn device residing at both hands of the same person, (iii) the smartphone and the smart wrist-worn device residing at opposite hands of the same person, and (iv) an unknown situation.

In some arrangements, the processing circuitry includes motion correlation circuitry which is coupled to the confidence scoring circuitry. In these arrangements, identifying the amount of correlation between the physical activity by the user and the physical activity by the wearer further includes providing, by the motion correlation circuitry, a motion correlation score to the confidence scoring circuitry, the motion correlation score being based on the first activity data and the second activity data and indicating a numerical measure of correlation between motion of the smartphone and motion of the smart wrist-worn device.

In some arrangements, the processing circuitry includes input correlation circuitry which is coupled to the confidence scoring circuitry. In these arrangements, identifying the amount of correlation between the physical activity by the user and the physical activity by the wearer further includes providing, by the input correlation circuitry, an input correlation score to the confidence scoring circuitry, the input correlation score being based on the first activity data and the second activity data and indicating a numerical measure of correlation between input entered into the smartphone as sensed by the smartphone and input entered into the smartphone as sensed by the smart wrist-worn device.

In some arrangements, the confidence scoring circuitry is constructed and arranged to output a series of confidence scores which includes the confidence score. In these arrangements, the method further includes applying a set of policies to the sequence of confidence scores to generate a set of policy decisions, the set of policy decisions controlling a set of resource access privileges.

In some arrangements, applying the set of policies to the sequence of confidence scores includes performing an authentication operation that provides an authentication result. The user of the smartphone is granted access to the set of resource access privileges when the authentication result indicates successful authentication, and the user of the smartphone is denied access to the set of resource access privileges when the authentication result indicates unsuccessful authentication.

In some arrangements, applying the set of policies to the sequence of confidence scores further includes, after the authentication operation is performed and after the authentication result indicates success authentication, performing a de-authentication operation that provides a de-authentication result. The user of the smartphone is granted continued access to the set of resource access privileges as long as the de-authentication result is negative (indicating that the user is likely the person that is the same as the wearer), and the user of the smartphone is denied access to the set of resource access privileges whenever the de-authentication result is positive (indicating that the user is not likely the same person as the wearer).

Another embodiment is directed to electronic circuitry which includes memory, and processing circuitry coupled to the memory. The memory stores instructions which, when carried out by the processing circuitry, cause the processing circuitry to:
(A) receive first activity data from a mobile device, the first activity data identifying physical activity by a user that is currently using the mobile device;
(B) receive second activity data from an electronic wearable apparatus, the second activity data identifying physical activity by a wearer that is currently wearing the electronic wearable apparatus; and
(C) based on the first activity data received from the mobile device and the second activity data received from the electronic wearable apparatus, perform an assessment operation that provides an assessment result indicating whether the user that is currently using the mobile device and the wearer that is currently wearing the electronic wearable apparatus are the same person.

Yet another embodiment is directed to a computer program product having a non-transitory computer readable medium which stores a set of instructions to perform a security operation. The set of instructions, when carried out by computerized circuitry, causes the computerized circuitry to perform a method of:
(A) receiving first activity data from a mobile device, the first activity data identifying physical activity by a user that is currently using the mobile device;
(B) receiving second activity data from an electronic wearable apparatus, the second activity data identifying physical activity by a wearer that is currently wearing the electronic wearable apparatus; and
(C) based on the first activity data received from the mobile device and the second activity data received from the electronic wearable apparatus, performing an assessment operation that provides an assessment result indicating whether the user that is currently using the mobile device and the wearer that is currently wearing the electronic wearable apparatus are the same person.

It should be understood that, in the cloud context, at least some of electronic circuitry is formed by remote computer resources distributed over a network. Such an electronic environment is capable of providing certain advantages such as centralized processing, scalability, fault tolerance, etc.

Other embodiments are directed to electronic systems and apparatus, processing circuits, computer program products, and so on. Some embodiments are directed to various methods, electronic components and circuitry which are involved in continuous seamless mobile device authentication using a separate electronic wearable apparatus.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to continuous seamless mobile device authentication using a separate electronic wearable apparatus. Along these lines, a legitimate user electronically pairs (e.g., configures) a mobile device and an electronic wearable apparatus to electronically communicate with and recognize each other. A comparison is then performed between activity of the mobile device and activity of the separate electronic wearable apparatus to determine whether the activity is from the same person. If the activity of the mobile device and the activity of the separate electronic wearable apparatus closely correlate, the current user of the mobile device and the current wearer of the electronic wearable apparatus are very likely the same person and successful authentication is achieved (and maintained). However, if the activity of the mobile device and the activity of the separate electronic wearable apparatus do not closely correlate, the current user of the mobile device and the current wearer of the electronic wearable apparatus are very likely different people (e.g., an unauthorized person that is not wearing the electronic wearable apparatus may have picked up the mobile device and attempted to access a protected resource via the mobile device) and thus further access is denied. Accordingly, there is robust and reliably security without the need for the user to continuously re-enter a password.

Figure 1:
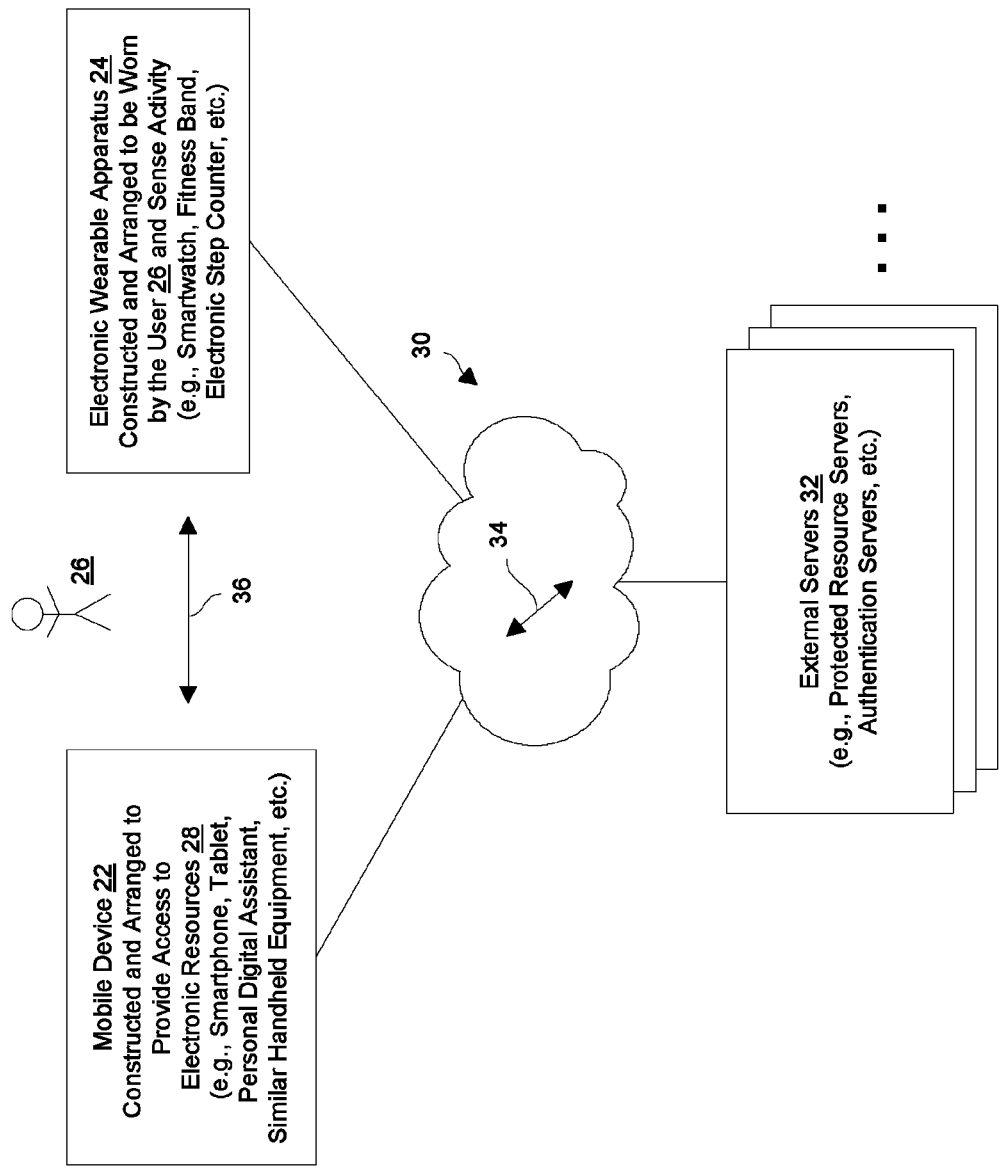
FIG. 1 is a block diagram of an electronic environment which is suitable for continuous seamless mobile device authentication using a separate electronic wearable apparatus.

FIG. 1 shows an electronic environment 20 which is suitable for continuous seamless mobile device authentication using a separate electronic wearable apparatus. The electronic environment 20 includes a mobile device 22 and an electronic wearable apparatus 24 which are currently in possession of the same legitimate (i.e., authorized) user 26.

The mobile device 22 is constructed and arranged to provide the legitimate user 26 with access to a variety of protected electronic resources 28. Such resources 28 may reside locally on the mobile device 22 (e.g., a local app, local data, a camera, privileges to make a cellular call, etc.) or remotely (e.g., remote account access, VPN access, permission to complete a transaction, etc.). Suitable form factors for the mobile device 22 include a smartphone, a tablet device, a personal digital assistant, similar handheld equipment, and the like. Suitable electronic resources 28 includes a cellular telephone, messaging apps, a camera, access to data (e.g., files, databases, accounts, etc.), the Internet, email, private networks, the ability to complete certain types of transaction, other privileges, social media apps and games, etc.

The electronic wearable apparatus 24 is constructed and arranged to be worn by the legitimate user 26 and sense activity (e.g., movement) while the user 26 operates the mobile device 22. Suitable form factors for the electronic wearable apparatus 24 include (e.g., a smartwatch, a smart ring, a smart glove, an electronic step counter, a fitness band or a similar device, etc.). It is assumed that the legitimate user 26 wears the electronic wearable apparatus 24 during operation.

It should be understood that the electronic environment 20 may include other electronic components and devices as well such as a communications medium (or fabric) 30, external servers 32 (e.g., protected resource servers, authentication servers, etc.), and so on. The communications medium 30 is constructed and arranged to convey electronic signals 34 between the mobile device 22 and an electronic wearable apparatus 24 if necessary, as well as from the mobile device 22 and/or the electronic wearable apparatus 24 to the other components and devices of the electronic environment 20 such as the external servers 32. Such signals 34 may be wireless, electrical, optical, combinations thereof, and so on.

Furthermore, the mobile device 22 and the electronic wearable apparatus 24 are capable of communications with each other without an external communications medium 30. Arrow 36 in FIG. 1 shows such communications (e.g., wireless communications such as Bluetooth).

During operation, both the mobile device 22 and the electronic wearable apparatus 24 sense user activity. In particular, the mobile device 22 receives input from the user 26 (e.g., user gestures on a touchscreen, button presses, orientation/acceleration while the mobile device 22 is being held and operated, etc.). Similarly, the electronic wearable apparatus 24 receives input from the user 26 (e.g., vibrations, accelerations, orientation, etc.) while the user 26 wears the electronic wearable apparatus 24 and concurrently holds and operates the mobile device 22.

Control circuitry of the electronic environment receives data identifying this sensed activity and determines whether correlation exists. Such control circuitry may reside within the mobile device, 22, within the electronic wearable apparatus 24, within one or more external servers 32, within the cloud, within combinations thereof, etc.

If the activity of the mobile device 22 correlates with the activity of the electronic wearable apparatus 24, the control circuitry considers the legitimate user 26 to possess both the mobile device 22 and the electronic wearable apparatus 24 since it is assumed that the legitimate user 26 is wearing the electronic wearable apparatus 24. In response to such a situation, the control circuitry outputs an electronic indication (e.g., a successful authentication result) that is suitable for granting access to one or more electronic resources 28. It should be understood that such authentication of the legitimate user 26 is essentially seamless since the legitimate user 26 is not required to routinely enter the user's password and/or other type of authentication factor to obtain and/or maintain access to the resources 28.

However, if correlation between the activity of the mobile device 22 and the activity of the electronic wearable apparatus 24 is poor (e.g., there is no correlation), the control circuitry considers the legitimate user 26 to not currently possess the mobile device 22 and thus does not authenticate the user to the mobile device 22 or de-authenticates the user from the mobile device 22. Rather, an unauthorized person may have picked up the mobile device 22 and attempted to operate it (e.g., attempted to access an electronic resource 28). In response to this situation, the control circuitry outputs a different electronic indication (e.g., an unsuccessful authentication result) that is suitable for denying access to one or more resources 28 (e.g., to de-authenticate or lockout the unauthorized person). Thus, any unauthorized person that picks up and tries to use the mobile device 22 is seamlessly denied access to the electronic resources 28. Further details will now be provided with reference to FIG. 2.

Figure 2:
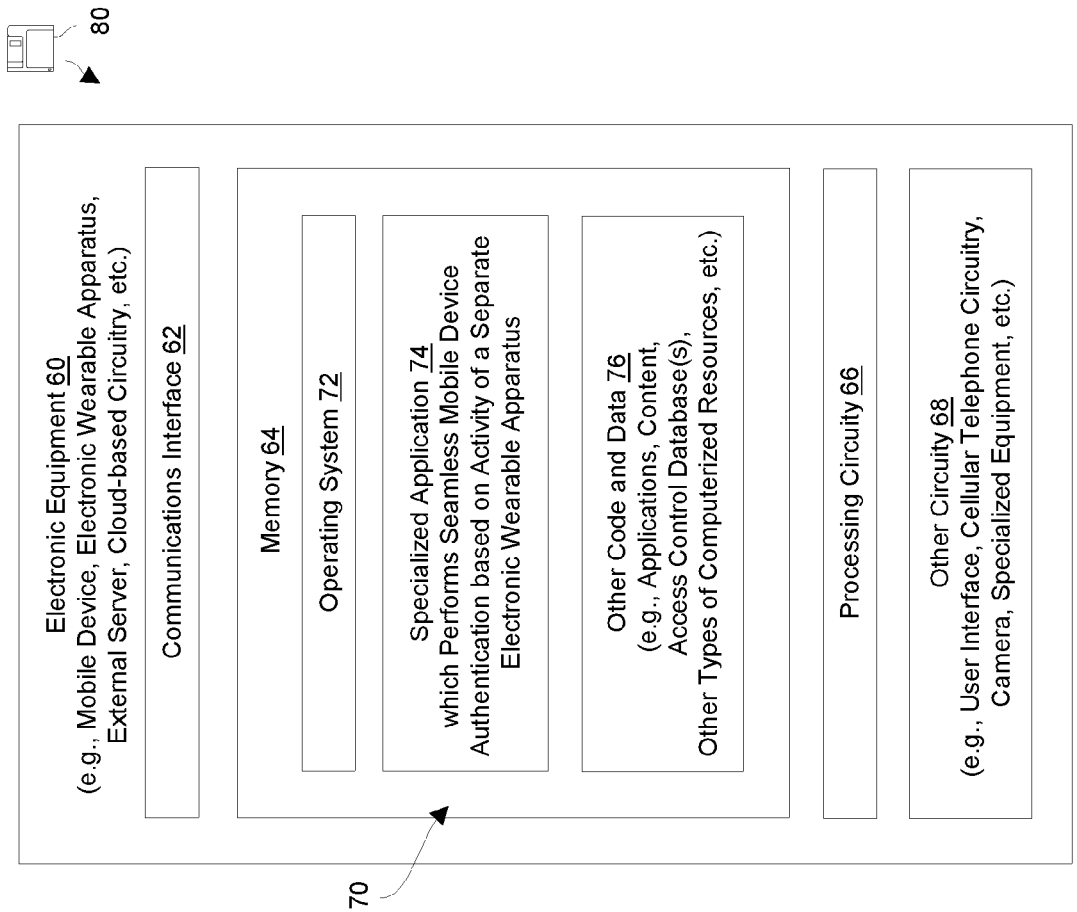
FIG. 2 is a block diagram of particular electronic equipment of FIG. 1.

FIG. 2 shows particular electronic equipment 60 which is suitable for forming the above-described control circuitry that performs seamless mobile device authentication. The electronic equipment 60 includes a communications interface 62, memory 64, processing circuitry 66, and other circuitry 68.

The communications interface 62 is constructed and arranged to connect the electronic equipment 60 to the communications medium 30 (also see FIG. 1) to enable communications with other electronic components and devices of the electronic environment 20. Such communications may be IP-based, SAN-based, cellular-based, cable-based, fiber-optic based, wireless (cellular, RF, infrared, etc.), cloud-based, combinations thereof, and so on. Accordingly, the communications interface 62 enables the electronic equipment 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, a specialized application 74 (i.e., code, instructions, etc.), and other code and data 76. The operating system 72 includes code such as a kernel to manage computerized resources (e.g., processor cycles, memory space, etc.), drivers (e.g., an I/O stack), utilities, APIs, and so on. The specialized application 74 includes code/instructions that direct the processing circuitry 66 to perform seamless mobile device authentication based on activity of a separate electronic wearable apparatus. The other code and data 76 refers to other software constructs such as applications, content, databases, other types of computerized resources, and so on.

The processing circuitry 66 is constructed and arranged to operate in accordance with the various software constructs 70 stored in the memory 62. As explained in further detail below, the processing circuitry 66 executes the specialized application 74 to form at least a portion of the above-described control circuitry that performs seamless mobile device authentication. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic equipment 60. In particular, the computer program product 80 has a non-transitory (or non-volatile) computer readable medium which stores a set of instructions which controls one or more operations of the electronic equipment 60. Examples of suitable computer readable storage media include tangible articles of manufacture and apparatus which store instructions in a non-volatile manner such as read-only memory (ROM), flash memory, disk memory, tape memory, and the like.

The other circuitry 68 refers to additional components of the electronic equipment 60. Along these lines, the electronic equipment 60 may be the mobile device 22 (FIG. 1) and the other circuitry 68 may include a user interface (e.g., a touchscreen), buttons, a camera, microphones and speakers, a set of accelerometers, a set of gyroscopes, an altimeter, global positioning system (GPS) circuitry, and so on. Alternatively, the electronic equipment 60 may be the electronic wearable apparatus 24 (FIG. 1) and the other circuitry 68 may include a touchscreen, buttons, a set of accelerometers, a set of gyroscopes, and so on. As yet another alternative, the electronic equipment 60 may be one or more external servers 24 (FIG. 1) and thus include other specialized circuitry (e.g., a risk-based authentication engine, user databases, content databases, a storage array, other protected resources, etc.), and so on. Further details will now be provided with reference to FIGS. 3 through 6.

Figure 3:
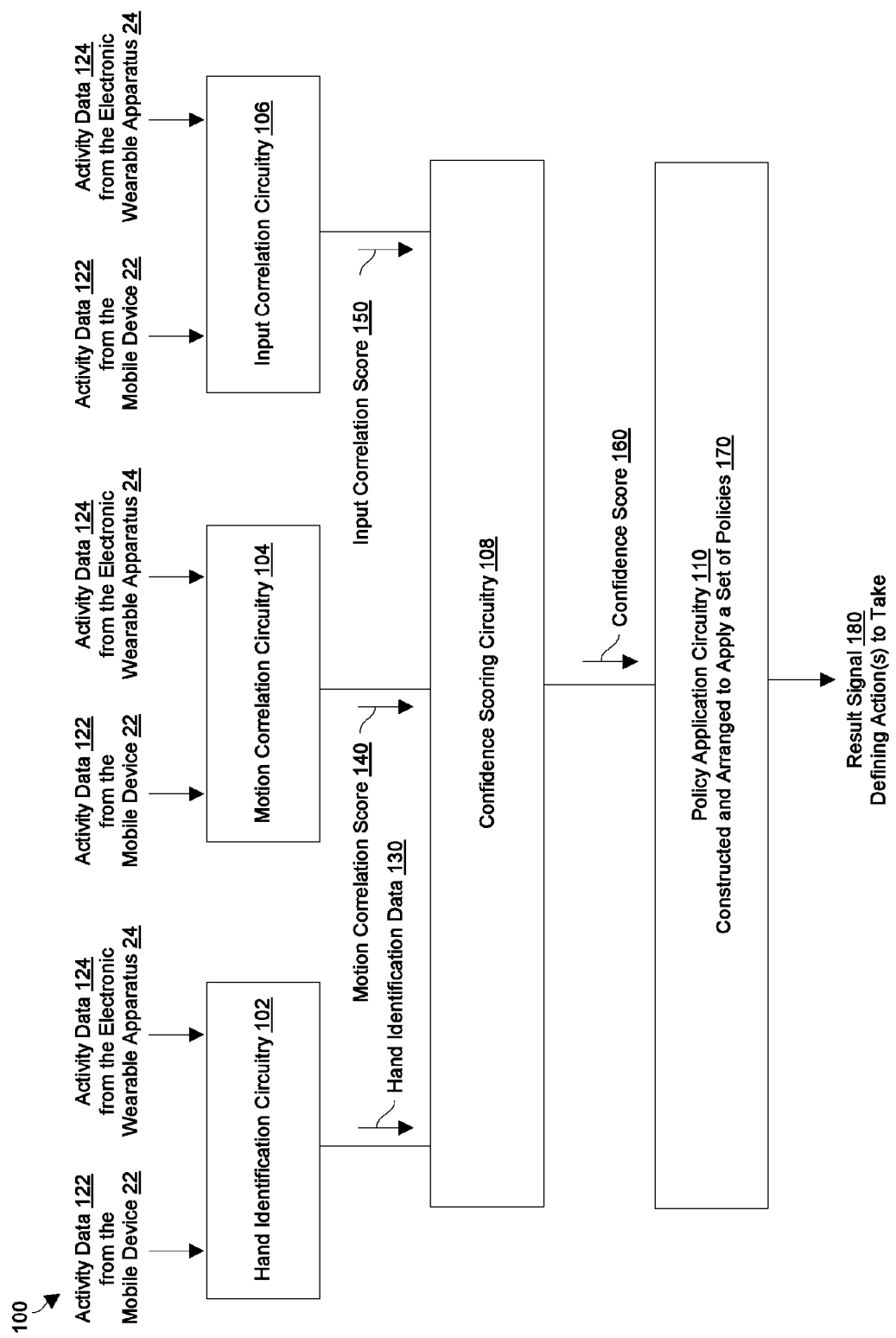
FIG. 3 is a block diagram of particular details of the particular electronic equipment of FIG. 2.
Figure 4:
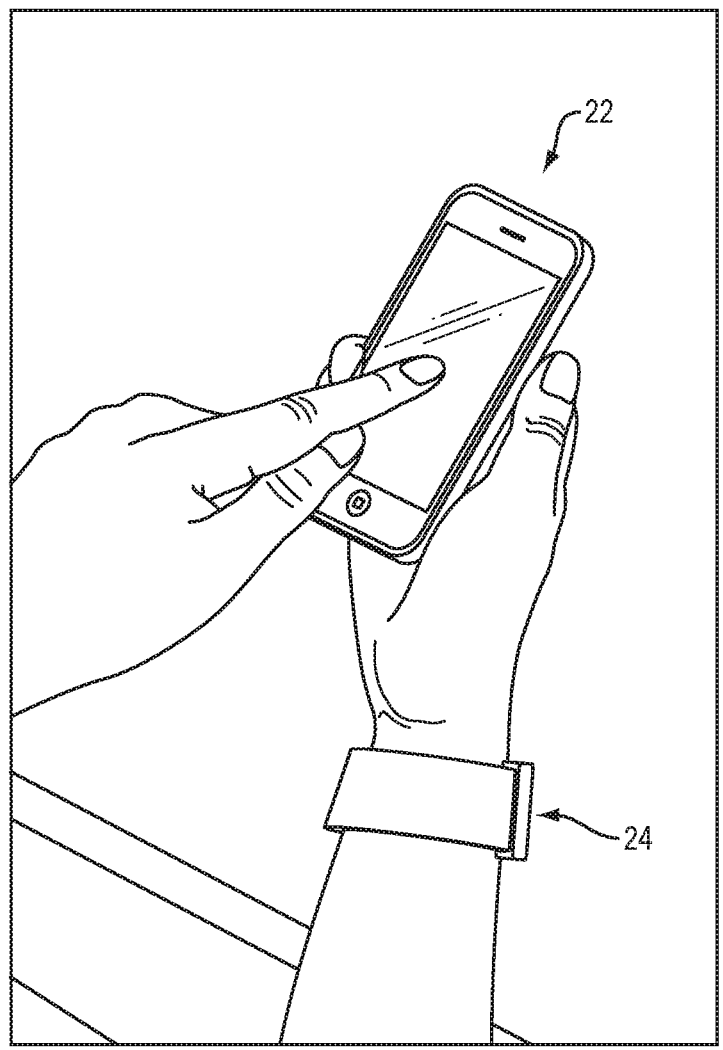
FIG. 4 is perspective view of a first situation for the electronic environment of FIG. 1.
Figure 5:
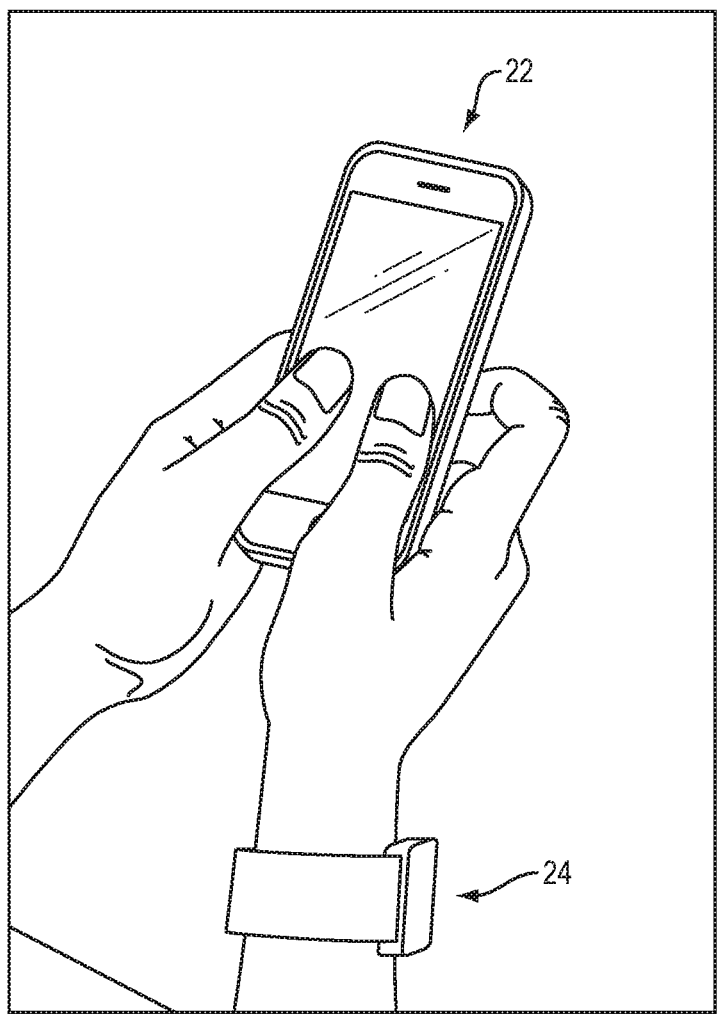
FIG. 5 is perspective view of a first situation for the electronic environment of FIG. 1.
Figure 6:
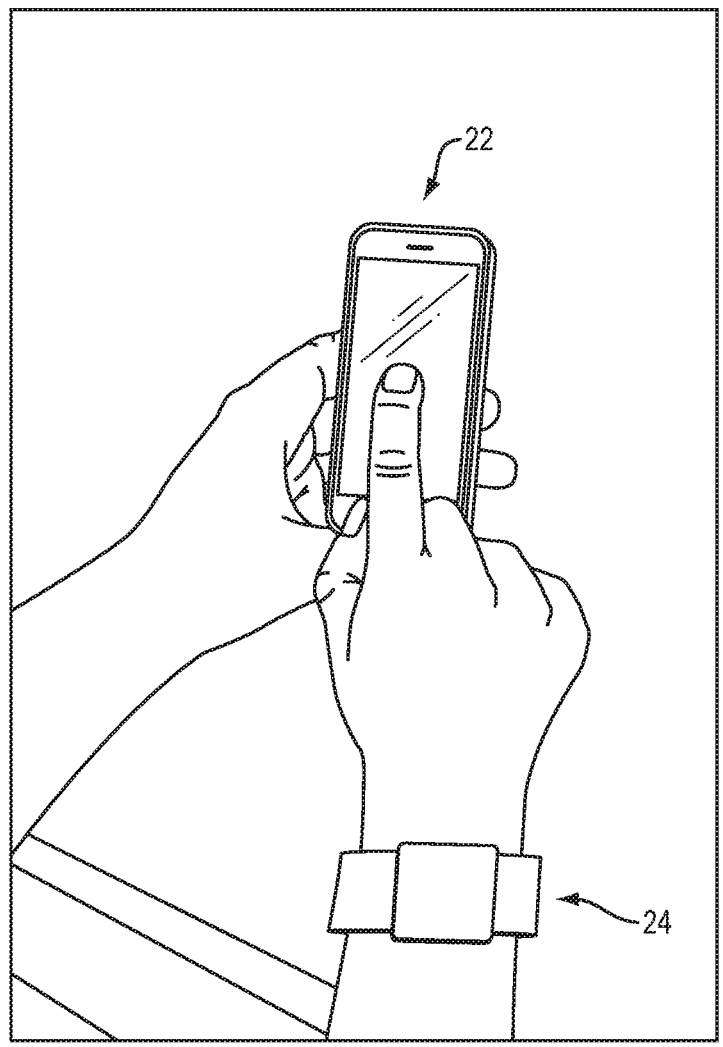
FIG. 6 is perspective view of a first situation for the electronic environment of FIG. 1.

FIG. 3 shows particular operating details of the electronic equipment 60 of FIG. 2. FIGS. 4 through 6 show particular hand-related situations that are ascertainable by the electronic equipment 60 during operation. In particular, FIG. 4 shows the user 26 holding the mobile device 22 and wearing the electronic wearable apparatus 24 on the same hand (i.e., on the wrist/arm portion of the same hand). FIG. 5 shows the user 26 holding the mobile device 22 with both hands and wearing the electronic wearable apparatus 24 on one hand. FIG. 6 shows the user 26 holding the mobile device 22 with one hand and wearing the electronic wearable apparatus 24 with the opposite hand.

As shown in FIG. 3, when the processing circuitry 66 runs in accordance with the specialized application 74, a variety of specialized circuits 100, i.e., the control circuitry, are formed which operate to richly and robustly perform continuous seamless authentication. The specialized circuits 100 include hand identification circuitry 102, motion correlation circuitry 104, input correlation circuitry 106, confidence scoring circuitry 108, and policy application circuitry 110. The confidence scoring circuitry 108 couples to each of the other circuits.

The hand identification circuitry 102 receives activity data 122 sensed from the mobile device 22 and other activity data 124 sensed from the electronic wearable apparatus 24. Along these lines, the activity data 122 identifies activity as sensed by the mobile device 22 while the activity data 124 identifies physical activity as sensed by the electronic wearable apparatus 24. It should be understood that such sensed activity may include user interface input (e.g., touchscreen user gestures such as taps or swipes, button presses, other types of UI activity, combinations of UI input, etc.), motion input (e.g., acceleration, orientation, etc.), as well as other types of input (e.g., GPS data, etc.).

Based on the activity data 122, 124, the hand identification circuitry 102 provides hand identification data 130 indicating how the mobile device 22 and the electronic wearable apparatus 24 are being used. In particular, the hand identification data 130 indicates whether:

(i) the mobile device 22 and the electronic wearable apparatus 24 reside at the same hand of the same person, as shown in FIG. 4,
(ii) the mobile device 22 and the electronic wearable apparatus 24 reside in both hands of the same person, as shown in FIG. 5,
(iii) the mobile device 22 and the electronic wearable apparatus 24 reside at opposite hands of the same person, as shown in FIG. 6, or
(iv) an unknown situation exists, i.e., it is likely that the mobile device 22 and the electronic wearable apparatus 24 are currently not being handled by the same person.

It should be understood that it may be convenient to describe the user 26 using the electronic wearable apparatus 24 "on a hand" (e.g., as in "wearing a smartwatch on a hand") even though the electronic wearable apparatus 24 is actually being worn on the user's wrist or arm of that hand (i.e., on the same side as the wrist or arm connected to that hand).

Similarly, based on the activity data 122, 124, the motion correlation circuitry 104 provides a motion correlation score 140 indicating a numerical measure of correlation between motion of the mobile device 22 and motion the electronic wearable apparatus 24. That is, when the mobile device 22 and the electronic wearable apparatus 24 reside at the same hand of the user 26 (FIG. 4) or at both hands of the user 26 (FIG. 5), the motion correlation score 140 indicates higher physical activity correlation in motion (e.g., movement, orientation, etc.) than if the mobile device 22 and the electronic wearable apparatus 24 reside at different hands of the user 26 or when the mobile device 22 is not even being held by the same user 26 wearing the electronic wearable apparatus 24.

Likewise, based on the activity data 122, 124, the input correlation circuitry 106 provides an input correlation score 150 indicating a numerical measure of correlation between input entered into the mobile device 22 as sensed by the mobile device 22 and input entered into the mobile device 22 as sensed by the electronic wearable apparatus 24. Here, when the mobile device 22 and the electronic wearable apparatus 24 reside at opposite hands of the user 26 (FIG. 6), the input correlation score 150 indicates higher physical activity correlation between (i) input received by the mobile device 22 and (ii) sensed movement/motion of the electronic wearable apparatus 24 compared to when the mobile device 22 is not even being held and operated by the same user 26 that currently wears the electronic wearable apparatus 24.

The confidence scoring circuitry 108 receives the hand identification data 130 from the hand identification circuitry 102, the motion correlation score 140 from the motion correlation circuitry 104, and the input correction score 150 from the input correlation circuitry 106. The confidence scoring circuitry 108 processes and analyzes this information, and provides a confidence score 160 based on at least some of this information. The confidence score 160 indicates a numerical measure of confidence that the user of the mobile device 22 and the wearer of the electronic wearable apparatus 24 are the same person, i.e., the legitimate user 26 (FIG. 1).

Along these lines, in response to each input provided to the mobile device 22 (e.g., typing, swipes, button presses, etc.), the hand identification circuitry 102 evaluates the activity data 122 from the mobile device 22 and the activity data 124 from the electronic wearable apparatus 24 and outputs the hand identification data 130 which identifies a current operating situation between the mobile device 22 and the electronic wearable apparatus 24 (also see FIGS. 4 through 6). Depending on the particular operating situation identified by the hand identification data 130, the confidence scoring circuitry 108 evaluates the motion correlation score 140, the input correlation score 150, or both. Then, based on this evaluation, the confidence scoring circuitry 108 provides the confidence score 160.

In some arrangements, the confidence score 160 is a raw score. In other arrangements, the confidence scoring circuitry 108 normalizes the confidence score 160 to a value between 0 and 1 inclusive. In these arrangements, a lower score indicates less confidence that the user of the mobile device 22 and the wearer of the electronic wearable apparatus 24 are the same person, and a higher score indicates more confidence that the user of the mobile device 22 and the wearer of the electronic wearable apparatus 24 are the same person.

The policy application circuitry 110 receives the confidence score 160 from the confidence scoring circuitry 108, applies a set of policies 170, and outputs a result signal 180 which defines a particular action or actions to take. Such actions may include unlocking the mobile device 22, granting access to one or more resources 28 via the mobile device 22, de-authentication or locking the mobile device 22, and so on.

For example, the policy application circuitry 110 can compare the confidence score 160 to a predetermined threshold to decide whether the overall control circuitry 100 considers the user of the mobile device 22 and the wearer of the electronic wearable apparatus 24 to be the same person. That is, if the confidence score 160 is higher than the predefined threshold, the policy application circuitry 110 considers the user of the mobile device 22 and the wearer of the electronic wearable apparatus 24 to be the same person. However, if the confidence score 160 is lower than the predefined threshold, the policy application circuitry 110 considers the user of the mobile device 22 and the wearer of the electronic wearable apparatus 24 not to be the same person.

In some arrangements, the set of policies 170 (e.g., a set of rules) are set up by the legitimate user 26 ahead of time. Here, such actions may be simple or complex.

For example, the control circuitry 100 may operate to control initial authentication before unlocking the mobile device 22. Here, "initial authentication" refers to verifying the user's identity once to allow access and the user cannot use the mobile device 22 without successful initial authentication.

As another example, the control circuitry 100 may operate to control de-authentication, i.e., locking the mobile device 22 following successful initial authentication. Here, the control circuitry 100 performs continuous authentication while the mobile device 22 is being used. If the control circuitry 100 determines that the user of the mobile device 22 and the wearer of the electronic wearable apparatus 24 are no longer the same person, the control circuitry 100 outputs a result signal 180 that denies further mobile device access.

As yet another example, the control circuitry 100 may operate to provide limited access to resources 28 via the mobile device 22. For example, suppose that the legitimate user 26 wishes to lend the mobile device 22 to a friend or colleague. For this situation, the control circuitry 100 may provide a result signal 180 that queries the legitimate user 26 for special permission to provide limited mobile device access, e.g., access to only certain resources 28 but not all resources 28 of the mobile device 22. Such access may continue under particular predefined conditions such as while the mobile device 22 remains in communication with the electronic wearable apparatus 24 (e.g., short-range wireless communication range).

As yet another example, the control circuitry 100 may operate to provide delegated access to resources 28 via the mobile device 22. For example, suppose that the legitimate user 26 wishes to lend the mobile device 22 to a particular person that has a second electronic wearable apparatus 24 (e.g., a second smartwatch or smart wristband) that can communicate with the mobile device 22 of the legitimate user 26. For this situation, the control circuitry 100 may provide a result signal 180 that supplies the second electronic wearable apparatus 24 with the power or capability to communicate with the mobile device 22 in the same manner as that of the first electronic wearable apparatus 24 (e.g., via short-range wireless communication range). In particular, the mobile device 22 of the legitimate user 26 may provision the second electronic wearable apparatus 24 which a credential (e.g., a secret, a cryptographic key, a cookie or other recognizable artifact, specialized code, etc.) that enables the mobile device 22 and the second electronic wearable apparatus 24 to communicate thus continuing delivery of the resources 28 to that particular person via the mobile device 22.

Other situations are suitable as well. Such policies 170 enable the legitimate user 26 to tailor/customize various scenarios to rich and reliable resource access control. Further detail will now be provided with reference to FIG. 7.

Figure 7:
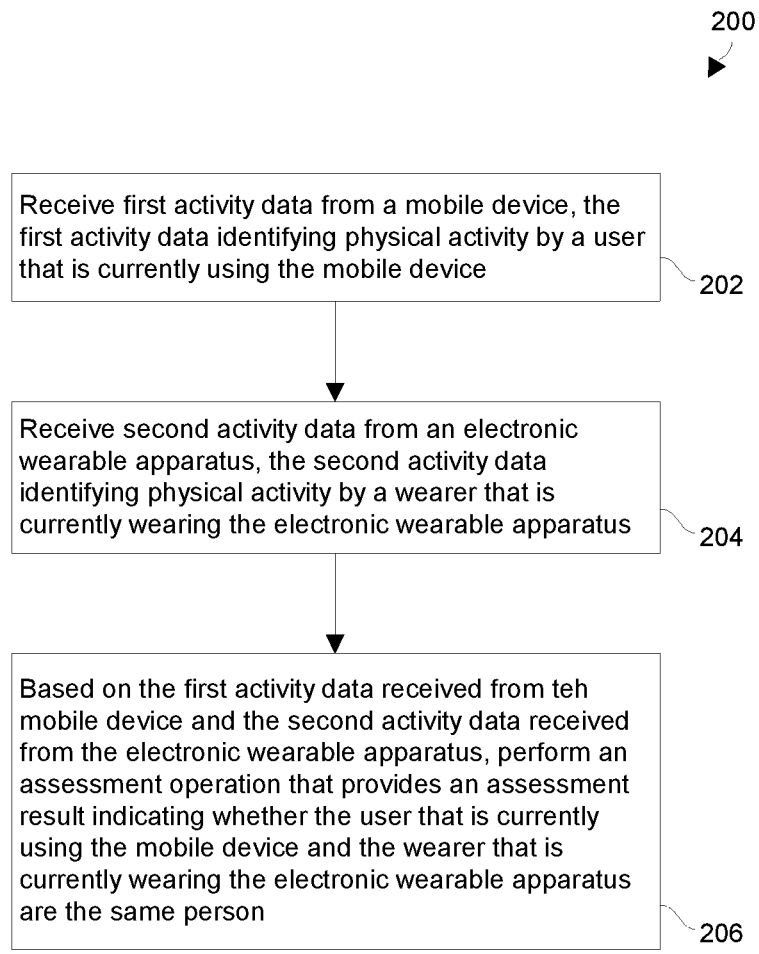
FIG. 7 is a flowchart of a procedure which is performed by the electronic environment of FIG. 1.

FIG. 7 is a flowchart of a procedure 200 which is performed by processing circuitry of the electronic environment 20 (also see FIG. 1). At 202, the processing circuitry receives first activity data from a mobile device. The first activity data identifies physical activity by a user that is currently using the mobile device. Along these lines, the mobile device may be a smartphone or similar type of device.

At 204, the processing circuitry receives second activity data from an electronic wearable apparatus. The second activity data identifies physical activity by a wearer that is currently wearing the electronic wearable apparatus. In particular, the wearer may be wearing the electronic wearable apparatus (e.g., a smartwatch or fitness band) on the wrist of the right hand or right side, or the left hand or left side.

At 206, based on the first activity data received from the mobile device and the second activity data received from the electronic wearable apparatus, the processing circuitry performs an assessment operation that provides an assessment result indicating whether the user that is currently using the mobile device and the wearer that is currently wearing the electronic wearable apparatus are the same person. Along these lines, the processing circuitry is able to determine whether the same person is wearing the electronic wearable apparatus and simultaneously operating the mobile device using the same hand (i.e., the person's right hand/arm or the person's left hand/arm), using both hands or opposite hands, or there is little or no correlation.

As described above, improved techniques are directed to continuous seamless mobile device authentication using a separate electronic wearable apparatus 24. In particular, the legitimate user electronically pairs (e.g., configures, joins, enrolls, etc.) the mobile device 22 and the electronic wearable apparatus 24 to electronically communicate with and recognize each other. A comparison is then performed between activity of the mobile device 22 and activity of the separate electronic wearable apparatus 24 to determine whether such activity is from the same person. If the activity of the mobile device 22 and the activity of the separate electronic wearable apparatus 24 closely correlate, the current user of the mobile device 22 and the current wearer of the electronic wearable apparatus 24 are likely the same person and successful authentication is achieved, as well as maintained. However, if the activity of the mobile device 22 and the activity of the separate electronic wearable apparatus 24 do not closely correlate, the current user of the mobile device 22 and the current wearer of the electronic wearable apparatus 24 are very likely different people (e.g., an unauthorized person that is not wearing the electronic wearable apparatus 24 may have picked up the mobile device 22 and attempted to access a protected resource via the mobile device) and thus further access is denied. Accordingly, there is robust security without the need for the user to continuously re-enter a password.

One should appreciate that the above-described techniques do not merely describe an abstract way to authenticate. Rather, the disclosed techniques involve improvements to the technology by providing a reliable way to authenticate without burdening the legitimate user with having the routinely re-enter a password. With these techniques, other advantages are available as well, such as providing de-authentication of the mobile device 22 when activity no longer correlates (reducing the likelihood that the legitimate user will disable the timeout feature of the mobile device 22), capabilities for limitation and access management, capabilities for delegation to other users, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the external servers 32 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Furthermore, it should be understood that the electronic wearable apparatus 24 described in the above embodiments may take a variety of form factors, including devices intended to be worn on the wrist (such as smartwatches, fitness bands, or smart bracelets), on the hand (such as smart gloves), or on the finger (such as smart rings).

Moreover, it should be understood that given the wide range of sensitive information stored in (or accessible through) smartphones and tablets, authentication may be essential to protect personal and business data. Many users find conventional methods of authentication to be burdensome, executed dozens of times every day—leading them to weaken or disable the authentication. Although some conventional smartphones support methods to ease the burden (such as fingerprint readers), these methods require active participation by the user, do not verify the user's identity after the phone is unlocked, and require hardware that may not be universally available for years.

However, disclosed herein and in accordance with certain embodiments, is an unobtrusive method for continuous authentication that allows smartphone's operating system (OS) or applications to verify that the phone is in the hands of its owner (or legitimate user). In this technique, henceforth called Continuous Seamless Authentication using Wristbands (CSAW), the user wears a wristband (a smartwatch, a fitness band, etc.) with built-in motion sensors and a radio allowing it to share wrist-motion data with the phone. CSAW correlates wrist motion with phone motion and phone input, and continuously produces a score indicating its confidence that the person holding (and using) the phone is the person wearing the wristband. This score provides the foundation for a wide range of authentication decisions. Experiments have shown that CSAW is accurate, usable, and secure. In some situations, CSAW is able to conduct initial authentication with over 99% accuracy and continuous authentication with over 98% accuracy.

One may appreciate that conventional authentication and de-authentication, unfortunately, may be manual processes that users repeat several times each day to lock and unlock their mobile devices. Conventional smartphones and tablets provide access to a wide range of sensitive services and personal information (e.g., email, photos, social networks, bank transactions, health records, enterprise data, and more); an unlocked phone is vulnerable to snoopy family, friends, co-workers, and passers-by. Furthermore, current phone authentication is an all-or-nothing decision; loaning one's phone to a colleague or family member (e.g., to make a call or play a game) typically gives them full access to all the content in the phone and services reachable through the phone.

Unfortunately, conventional phone authentication methods are seen as slow or inconvenient, especially when users use their phones numerous times in a day. As a result, many users take risky shortcuts: about 44% of conventional smartphone users may not use passcodes at all, and many others may choose simple, easy-to-remember, and easy-to-type passwords. Smartphones and tablets need an unobtrusive and secure method for authentication (and de-authentication).

Continuous Seamless Authentication using Wristbands (CSAW) refers to a system which allows a phone to passively and continuously verify that the phone is literally in the hands of its owner. CSAW (pronounced 'seesaw') may be considered a fundamentally new service to applications and subsystems on the phone, a foundation for initial authentication (the phone unlocks when picked up by the owner), de-authentication (the phone locks when accessed by someone other than the owner), limitation (the phone allows guest access to many apps, but limits sensitive apps to the owner), and delegation (the owner can temporarily grant specific access to another specific person).

CSAW works by correlating the owner's wrist motion with phone motion and phone input and continuously producing a score indicating its confidence that the person holding (and using) the phone is indeed the owner. The owner wears a smartwatch or a fitness band (watch', for short) with built-in motion sensors (accelerometer and gyroscope) and a wireless radio allowing it to share wrist-motion data with the phone (e.g., Bluetooth Low Energy). Like any smartwatch or fitness band, the watch is pre-paired with the phone and, in CSAW, serves as an identity token for authenticating to the phone. It is safe to assume that the watch is indeed on the wrist of the phone owner.

CSAW succeeds because it incorporates the following technical approaches: (i) a hybrid correlation model that: (a) recognizes how the owner is holding the phone and (b) once a grip is classified, correlates either phone motion or phone input with wrist motion; (ii) three-axis motion features that leverage phone and watch orientation; and (iii) temporal features that require any adversary to synchronously mimic the owner in order to use or unlock the owner's phone.

It should be understood that although smartphones are expressly described, the techniques can also be applied to tablets and the like; the term phone refers to smartphones unless otherwise noted. Similarly, the term watch refers to smartwatches, although the CSAW capabilities could easily be met by typical fitness bands and the like as well. Both types of wristband devices are becoming a common accessory, and CSAW adds another benefit to wearing one such device.

One should appreciate that smartphones and tablets are hand-held mobile devices. People interact with phones using their hands: they provide touchscreen input (taps and swipes), they pick them up, they carry them around, etc. The phone can monitor its own motion with its internal accelerometer and gyroscope, and can observe touchscreen inputs (taps and swipes) as recorded by the phone OS. The phone's motion and touchscreen inputs should correlate with the owner's hand movements (measured by the motion sensors on the watch), verifying that the owner is in fact the person providing input to the phone. Indeed, CSAW can passively continue to monitor the correlation and de-authenticate the user (lock the phone) when the wrist motion no longer matches phone input or motion. In that regard, CSAW may be combined with ZEBRA, which correlates wrist motion with keyboard and mouse input on desktop computers; CSAW extends that (de-authentication enabled by continuous user verification) to provide a broader foundation and to address challenges unique to mobile devices like smartphones.

CSAW provides a continuous quantitative estimate of the confidence that a phone's current user is in fact the phone's owner, assuming that the phone's owner is wearing the owner's watch. For each user-phone interaction, CSAW correlates two different observations by two distinct devices: 1) an observation derived from motion data from sensors in the watch; and 2) an observation derived from motion and input sensors in the phone. CSAW feeds these observations to an agent that estimates the likelihood that the two observations correspond to the same interaction. The agent then combines the likelihood numbers from recent interactions to provide its confidence metric to the phone operating system and, in some cases, to applications. Depending on the use-case and on policies set by the owner (or owner's employer), the system (or application) can use the confidence metric to take actions (e.g., to unlock the phone when picked up by its owner, or restrict access to certain applications according to who is using the phone).

It should be further understood that a mobile device is able to use the CSAW confidence metric to support initial authentication, de-authentication, limitation, and delegation.

Initial Authentication

Initial authentication refers to the act of verifying the identity of a user to grant access to the phone when the phone is locked. Thus, initial authentication is required to unlock the phone. It is important to distinguish between initial authentication and continuous authentication. Initial authentication refers to verifying a user's identity once to allow her access to the phone; a user cannot use the phone without a successful initial authentication.

CSAW's interaction correlations can be used by an agent to implement fast initial authentication, leveraging natural interactions before the individual uses the phone or an application. Authentication can start even before the screen is on—for example, while the individual is getting her device out of her pocket or while she is walking with the smartphone in hand—so she need only press the home button to turn on the screen and the authentication is complete. CSAW could also be combined with a fingerprint reader, or a mechanism such as Smart Lock from Android, to make a strong multi-factor authentication system.

De-Authentication Via Continuous Authentication

Continuous authentication is the act of verifying the user's identity continuously while the phone is being used, after a successful initial authentication. De-authentication, as the name suggests, is the reverse of authentication. It refers to removing the user's access to the phone, so that if the user wants to use the phone again she has to start with initial authentication. De-authentication can be done by locking the phone, or logging the user out in case of a multi-user phone or tablet.

Common authentication schemes (such as those based on passwords, passcodes, swipe patterns, or fingerprints) do not perform automatic de-authentication, i.e., they authenticate the user once but then rely on the user to de-authenticate (lock) the device. The most common solution for automatic conventional de-authentication is timeouts, i.e., to automatically lock the device after a period of inactivity. But users tend to choose long timeouts so they do not have to login often to their devices; users unlock their smartphones on average about 25 times per day. Long timeouts create an attack window; someone can access a user's smartphone if she leaves it behind and walks away. In fact, people do worry about someone else accessing their phone in their absence; in a recent study 19% of the study participants admitted to snooping and about 15% admitted to having caught someone in the act of snooping. Thus, automatic de-authentication is important; CSAW's approach for automatic de-authentication is a combination of continuous authentication and timeouts. Individuals using CSAW for automatic de-authentication can comfortably set a long timeout interval, knowing that if anyone else attempts to use their phone before the timeout, the CSAW agent will recognize that the phone's user is not the phone's owner and then lock the phone.

Limitation and Access Management

Consider a smartphone owner who lends her phone to a child to play games, or who lends her phone to a friend to search the Internet for a recipe. She may worry that app notifications can display personal information or that the borrower may launch an app providing access to sensitive systems at her place of work. CSAW's agent can support a notification engine that presents app notifications only when the owner is using the phone, or support an OS home-screen app launcher to limit which applications can be used when a guest (non-owner) is using the phone.

Delegation to Other CSAW Users

Consider again a smartphone owner who wants to lend her phone to a spouse or trusted co-worker to allow them to access specific applications or view specific photo albums, without allowing them full access to the phone. The CSAW agent could provide her an interface to delegate access to that trusted other user, essentially, introducing her phone to that user's watch (and thus to that user's identity) so that the delegated user may use her phone in the future for certain approved purposes. Although this mechanism requires thoughtful attention to the user interface (and such a design is outside the scope of this paper) the CSAW system could be easily extended to support such a use case. CSAW would recognize multiple watches and receive motion data from those that are present, generating a confidence score for each one; the person whose watch data generates the highest confidence score is deemed to be the current user of the phone, and that information can drive the phone's access-control decisions.

Further Details

In accordance with certain embodiments, CSAW rests on a few simple assumptions. These are listed below.

For watch hardware, the watch has built-in accelerometer and gyroscope sensors and a radio that can communicate securely with the user's phone. These technologies may be available in fitness bands and smartwatches today, and CSAW may be integrated into similar devices.

The watch is paired. That is, the phone owner pairs her watch with her phone using any secure method. All subsequent communication is encrypted for confidentiality, integrity, and mutual authenticity. Bluetooth low energy (BLE) will suffice.

The watch is worn. That is, the phone owner wears her watch on one of her wrists, called the 'watch hand'; either hand is fine.

The watch is specific to a particular user. That is, the phone owner will not share her watch with others because in CSAW the watch acts as the owner's authentication proxy. (Fitness bands and smartwatches are considered personal wearable devices and indeed are less likely to be shared than a smartphone.) If desired, one could securely link the watch to its owner (to prevent any unintended sharing) by detecting when the watch is removed and requiring its owner to enter a password (either on the watch or her smartphone), or using a biometric to identify the owner, when she dons the watch.

The clocks are synchronized. Here, the phone and the watch clocks are synchronized; the phone can synchronize with the watch over BLE.

CSAW is able to handle different challenges. These challenges are discussed below.

For two hands and one watch, CSAW authenticates the phone owner by correlating the motion from her watch and the phone, but if the owner holds the phone in her non watch-hand CSAW cannot use motion correlation. CSAW addresses this challenge by identifying with which hand the owner is holding the phone and with which hand she is providing input. When the owner uses her watch-hand to provide input to the phone, while holding the phone in the other hand, CSAW authenticates the user by correlating the user's taps and swipes with the user's wrist movement.

There may be disparate data types. Here, data for phone input may be different than for wrist movement (acceleration and rotational velocity). CSAW aims to correlate these two data sources despite their different data types.

To address temporal correlation, authentication methods based on behavioral gestures also use motion correlation, but correlate a current gesture with the user's template gesture collected in the past. These methods are vulnerable to someone copying the user's gesture style, and require the user to perform the same specific gesture to authenticate. To minimize false positives (in which CSAW has confidence the phone is in use by the owner, when someone else is using the phone), CSAW's machine-learning and correlation algorithms require temporal correlation; for an adversary to unlock the user's phone, the owner must be present and the adversary must mimic the owner's current wrist motion in real-time.

It should be understood that the CSAW agent monitors wrist motion, phone motion, and phone inputs so it can determine whether they are correlated and produce a summary metric called the confidence score, a value between 0 and 1 that indicates the agent's confidence that the user of the phone is indeed the watch-wearing owner. Specifically, it produces fresh scores every 1-2 seconds: an instantaneous estimate C(t) based on the latest data at time t, and an EWMA $\overline{C}(t)$ that smoothes recent scores:

$$\overline{C}(t)=(1-\alpha)C(t)+\alpha\overline{C}(t-1)$$

where the factor α weights the contribution of the new confidence score. As described above, application and system policies can use these metrics to drive authentication-related decisions. In this section, the structure of the CSAW agent and the calculations that lead it to produce this periodic confidence score are described.

CSAW receives a steady stream of motion data from the phone ($P_m$) and the watch ($W_m$), and touchscreen input data from the phone ($P_t$). These data flows are segmented into windows and examined by three modules, described below; the "grip detector" determines how the user holds the phone, the correlates phone and watch motion, and the correlates phone input and watch motion. The resulting correlation metrics are considered by the scoring engine that actually computes C(t).

Although CSAW outputs a confidence value, frequently, not all of its modules need be active continuously. When the watch is not present, perhaps because the owner has stepped out of range of the phone, there is no watch data ($W_m$); the correlation modules simply output 0 (not correlated) and that drives the confidence score C(t) to 0 (lowest confidence). When the watch is present but the phone is experiencing no input or motion, perhaps sitting on a table or in a bag near the owner, all the modules can 'rest' (to save energy) and the confidence score is again C(t)=0. Indeed, CSAW calculates the correlation between the watch motion and the phone motion/inputs only when there is a user-phone interaction, that is, any action by the user that provides input to the phone or changes the phone's position (which can be sensed by the accelerometer and gyroscope sensors). Examples of user-phone interaction include the user picking up her phone or sending a text message on her phone. As soon as phone input or motion is detected, the watch is instructed to start sending motion data, and the correlation modules become active.

The CSAW architecture is extensible; other sensor or contextual information could be correlated or used as input to the scoring module. Such extensions may be combined with other technologies as well.

In terms of grip detection, phones can be used with one hand or with both hands. The grip module recognizes the grip, i.e., which hand is holding the phone and which hand is providing input, when the phone is being used. A grip may use two characters XY, where X is the hand holding the phone and Y is the hand providing input. The owner can hold (or provide input) with the watch-hand (W), the non-watch-hand (N), or with both hands (B); thus, X and Y can each be W, N, or B. If the phone is not held in either hand, it is denoted with U (unknown).

Motion-to-motion correlation (correlation between the watch motion and the phone motion) is stronger when the watch and the phone are tightly coupled, i.e., when the owner is holding the phone with the watch-hand (WW, WN, BB), but weak when the owner is holding the phone with the other hand (NW, NN). Motion-to-input correlation (correlation between the watch motion and the phone's touch inputs) is stronger if the watch-hand is used to provide the touch inputs. Knowing the grip during a user-phone interaction helps CSAW use the appropriate correlation method to improve the accuracy of the confidence score.

When the owner is providing touch inputs, the grip can be identified using the orientation of the watch relative to the phone's orientation. The watch orientation (relative to the phone's orientation) is different when 1) the watch-hand is only used to hold the phone (input given by non-watch-hand), 2) when the watch-hand is used to hold the phone and provide input, and 3) when the watch-hand is only used to provide input (phone held with the non-watch-hand). Assuming the watch is worn with its face on the outside of the wrist, and the phone is relatively horizontal, the above cases have the watch face 1) horizontal facing down, 2) slightly vertical facing outwards, and 3) horizontal facing upwards, respectively. This module produces an output indicating the grip only when the phone is in use. The output at time t is a two-character string g(t) representing the grip: BB, WN, NW, or UU; UU (unknown) implies this module could not determine the grip. CSAW treats WW and BB as the same grip, because in both these grips watch-hand is holding the phone and their relative orientations are similar. This module cannot determine grips that do not involve the watch-hand (NN), such as grips where the phone is resting on a surface and input is provided by the non-watch-hand.

The module correlates the watch motion with the phone motion to determine whether the phone is held by the user wearing the watch. When the phone is in motion or in use, this module receives two continuous streams of motion data from the watch ($W_m$) and the phone ($P_m$), each a series of sensor data samples of the form (t,ax,ay,az,gx,gy,gz), where t is the time when the sample was collected, and ax,ay,az and gx,gy,gz are the values from accelerometer and gyroscope sensors along their x,y,z axes respectively. The input data streams are segmented using sliding windows of size $w_m$ with overlap fraction $o_m$; CSAW uses $o_m=0.5$ and $w_m=2$ seconds when the phone is locked and $w_m=4$ seconds when it is unlocked. For a window ending at time t, the module outputs a correlation score $c_m(t)$ indicating how well the two motions correlate ($0 \leq c_m(t) \leq 1$).

For each segmented window, a correlation feature vector $F_c$ with features from time and frequency domains is computed. In particular, the following are usable: mean, standard deviation, mean value crossing rate, variation, interquartile range, median, mean absolute deviation, skew, kurtosis, power, energy, and peak-to-peak amplitude, each a statistical representation of a signal. Two signals are compared by computing two numbers for each of those 12 statistics—absolute difference and relative difference (ratio)—resulting in 24 features. These features, however, compare aggregate statistics of the two signals without examining whether they vary the same way with time. To those 24 non-temporal features eight temporal features are added, as follows. Two (cross-correlation and correlation-coefficient) measure similarity between two signals and how they vary together in time domain, and a third (coherence) measures similarity and variance in the frequency domain. Five more features select the two highest peaks in both signals and compare their corresponding peak timestamps, amplitudes, and inter-peak times. Thus, for any two signals features are computed. Since there are four signals (x,y,z and magnitude) each from the accelerometer and gyroscope, the final feature vector $F_c$ has $256=4 \times 2 \times 32$ features.

To determine the correlation score, uses a model that estimates the probability that a given feature vector $F_c$ represents two motions that correlate. A random-forest binary classifier trained to classify a feature vector as 0 (not correlated) or 1 (correlated) is used. The classifier is trained earlier using wrist-motion data and phone motion data from the same subject as positive labels, and wrist-worn data from a subject (for different activities such as walking, stationary, typing on PC, doing same task on phone) with phone motion data from another subject as negative labels. For a given feature vector, the classifier computes probability estimates for the two labels (0 and 1); outputs the classifier's probability estimate for label 1 as its correlation score $c_m(t)$.

The module correlates watch motion with phone touch inputs to determine whether the touch inputs are given by the owner using her watch-hand. It outputs a correlation score $c_i(t)$ indicating how well the wrist motion correlates with the phone input at time t, where $0 \le c_i(t) \le 1$.

This module receives a stream of wrist motion data ($W_m$, as above) and stream of phone touch events ($P_i$) of the form p=(t,id,x,y), where t is the time when the sample was collected, id is the unique ID assigned by the phone OS to identify a series of touch events performed by a single tracker/finger, and x and y are the x- and y-coordinates on the touchscreen where the user touched the screen respectively. When the phone display is on, the Android OS is constantly sampling the touchscreen to capture touch events. A tap is a series of touch events with the same tracking ID (id) but different timestamp (t) and position (x,y). Similarly, a swipe is also a series of touch events with the same id and with different t, x, and y, but a swipe is a longer touch interaction than tap, so it contains more samples than a tap.

The input data streams ($W_m$ and $P_i$) are segmented based on touch interactions; that is, each window of data represents exactly one touch interaction (tap or swipe). For a touch interaction ending at time t the corresponding motion data from the watch (using the start and end time of the touch interaction) is extracted. A feature vector is then computed from the watch data, using the same 12 standard statistics (mean, standard deviation, mean value crossing rate, variation, interquartile range, median, mean absolute deviation, skew, kurtosis, power, energy, and peak-to-peak amplitude) of the accelerometer and gyroscope magnitudes. The result is a 12-feature vector $F_t$.

A two-tier classification approach is then used to correlate wrist motion with the touch input. In the first tier, it is determined whether $F_t$ is a touch interaction (tap or swipe) using a binary classifier trained earlier using wrist-motion data from tap and swipe touch interactions as positive labels, and wrist-motion data from other activities (such as walking, wrist stationary, and typing on computer) as negative labels. In the second tier, an interaction-specific model is used to identify the likelihood that $F_t$ (representing the watch motion) is indeed the touch interaction (phone input) performed by the user; this classifier was trained earlier using wrist-motion data from taps and swipes. The likelihood score is then provided from the second tier as its correlation score $c_i(t)$.

This module helps address part of the two hands, one phone challenge, by addressing the grips that involve input with the watch-hand but do not involve the watch-hand holding the phone. It also addresses the challenge of correlating disparate data by using interaction-specific models, and a two-tier classification approach to improve accuracy.

In connection with the confidence scorer, this module periodically outputs the confidence score C(t) ($0 \le C(t) \le 1$) at time t. To generate the confidence score, the module uses the correlation scores from the module $c_m(t)$ and the module $c_i(t)$, and the grip from the grip module g(t). CSAW intentionally favors, because computes correlation over more data, its output is more frequent, and it does not depend on the user's touch events. Indeed, CSAW uses only when output of is not reliable, i.e., when the watch and phone are not tightly coupled (the phone is not held with the watch-hand). In short, $$C(t) = \begin{cases} c_i(t) & \text{if } g(t) \in \{NW, UW\} \\ c_m(t) & \text{otherwise} \end{cases}$$

The confidence-scoring module could be generalized to use a weighted average $C(t)=ac_m(t)+bc_i(t)$ instead, where a and b are weights (a+b=1) determined by the grip g and other information.

In connection with policy decisions, the CSAW agent does not itself make any authentication-policy decisions, or take any actions relating to such decisions. Its role is simply to produce the confidence score as an input to applications or subsystems that need to make such decisions and would benefit from knowledge that the phone is indeed in the hands of its owner. CSAW's confidence metric may be used for decisions relating to initial authentication, de-authentication, limitation, or delegation. Depending on policies set by the owner (or owner's employer), the system (or application) can use the confidence metric to take actions (e.g., to unlock the phone when picked up by its owner, or restrict access to certain applications or websites according to who is using the phone). Perhaps the simplest approach is a threshold policy: at time t, if $C(t) \ge \delta$ for some predefined threshold $\delta$, proceed as if the user is indeed the owner. Conversely, when $C(t) < \delta$, assume that an imposter is using the phone and take protective action. This simple-minded approach may be too reactive, as C(t) changes every 2 seconds, and false negatives (inappropriately low C when the owner is in fact the user) will make the phone unusable. The EWMA may be more reliable: proceed if $\overline{C}(t) \ge \delta$. Other options are possible, such as voting ($C(t) \ge \delta$ for at least k out of n recent values), trending (a non-decreasing slope of C(t) values over a recent window), and so forth.

Regarding a confidence booster, CSAW can help with another important category: second-chance actions. In situations when the confidence value derived from natural user-phone interactions is low, the system could ask the owner to perform some explicit actions to improve confidence. For example, in a system using CSAW for initial authentication, the phone might fail to unlock due to low confidence in the correlation during a pick-up maneuver. The phone could display a notice asking the user to place the phone in their watch hand and then quickly rotate their hand (and phone) two or three times; CSAW can easily correlate these motions. Alternately, after asking the user to place the phone in their watch hand, the phone could vibrate and CSAW could examine the watch accelerometer data for a vibration signal.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of performing a security operation, the method comprising:
  receiving, by processing circuitry, first activity data from a mobile device, the first activity data identifying activity by a user that is currently using the mobile device;
  receiving, by the processing circuitry, second activity data from an electronic wearable apparatus, the second activity data identifying physical activity by a wearer that is currently wearing the electronic wearable apparatus; and
  based on the first activity data received from the mobile device and the second activity data received from the electronic wearable apparatus, performing, by the processing circuitry, an assessment operation that provides an assessment result indicating whether the user that is currently using the mobile device and the wearer that is currently wearing the electronic wearable apparatus are the same person;
wherein the mobile device is a smartphone, and the user is currently using the smartphone;
wherein the electronic wearable apparatus is a smart worn device, and the wearer is currently wearing the smart worn device;
wherein performing the assessment operation includes identifying an amount of correlation between the activity by the user and the physical activity by the wearer;
wherein the processing circuitry includes confidence scoring circuitry;
wherein identifying the amount of correlation between the activity by the user and the physical activity by the wearer includes:
  providing, by the confidence scoring circuitry, a confidence score that indicates a numerical measure of confidence that the user and the wearer are the same person;
wherein the processing circuitry further includes hand identification circuitry which is coupled to the confidence scoring circuitry; and
wherein identifying the amount of correlation between the activity by the user and the activity by the wearer further includes:
  providing, by the hand identification circuitry, hand identification data to the confidence scoring circuitry, the hand identification data being based on the first activity data and the second activity data and indicating one of: (i) the smartphone and the smart worn device residing at the same hand of the same person, (i) the smartphone and the smart worn device residing at both hands of the same person, (iii) the smartphone and the smart worn device residing at opposite hands of the same person, and (iv) unknown.

2. A method as in claim 1 wherein the smartphone communicates with the smart worn device via short-range wireless communications; and
  wherein receiving the second activity data from the electronic wearable apparatus includes acquiring the second activity data by the smartphone from the smart worn device via the short-range wireless communications.

3. A method as in claim 2 wherein the processing circuitry resides within the smartphone; and
  wherein the method further comprises:
    controlling, by the processing circuitry, access to a protected electronic resource which is accessible via the smartphone based on the amount of correlation between the activity by the user and the physical activity by the wearer.

4. A method as in claim 2 wherein the processing circuitry resides within an external server which is remote from the smartphone and from the smart worn device;
  wherein the external server receives the second activity data from the smartphone after the smartphone acquires the second activity data from the smart worn device; and
  wherein the method further comprises:
    controlling, by the processing circuitry, access to a protected electronic resource which is accessible via at least one of the smartphone and the smart worn device based on the amount of correlation between the activity by the user and the physical activity by the wearer.

5. A method as in claim 1 wherein the smart worn device communicates with the smartphone via short-range wireless communications; and
  wherein receiving the first activity data from the smartphone includes acquiring the first activity data by the smart worn device from the smartphone via the short-range wireless communications.

6. A method as in claim 5 wherein the processing circuitry resides within the smart worn device; and
  wherein the method further comprises:
    controlling, by the processing circuitry, access to a protected electronic resource which is accessible via the smart worn device based on the amount of correlation between the activity by the user and the physical activity by the wearer.

7. A method as in claim 1 wherein the processing circuitry further includes motion correlation circuitry which is coupled to the confidence scoring circuitry; and
  wherein identifying the amount of correlation between the activity by the user and the physical activity by the wearer further includes:
    providing, by the motion correlation circuitry, a motion correlation score to the confidence scoring circuitry, the motion correlation score being based on the first activity data and the second activity data and indicating a numerical measure of correlation between motion of the smartphone and motion of the smart worn device.

8. A method as in claim 1 wherein the processing circuitry further includes input correlation circuitry which is coupled to the confidence scoring circuitry; and
  wherein identifying the amount of correlation between the activity by the user and the physical activity by the wearer further includes:
    providing, by the input correlation circuitry, an input correlation score to the confidence scoring circuitry, the input correlation score being based on the first activity data and the second activity data and indicating a numerical measure of correlation between input entered into the smartphone as sensed by the smartphone and input entered into the smartphone as sensed by the smart worn device.

9. A method as in claim 1 wherein the processing circuitry further includes motion correlation circuitry which is coupled to the confidence scoring circuitry, and input correlation circuitry which is coupled to the confidence scoring circuitry; and
  wherein identifying the amount of correlation between the activity by the user and the physical activity by the wearer further includes:

providing, by the motion correlation circuitry, a motion correlation score to the confidence scoring circuitry, the motion correlation score being based on the first activity data and the second activity data and indicating a numerical measure of correlation between motion of the smartphone and motion of the smart worn device; and providing, by the input correlation circuitry, an input correlation score to the confidence scoring circuitry, the input correlation score being based on the first activity data and the second activity data and indicating a numerical measure of correlation between input entered into the smartphone as sensed by the smartphone and input entered into the smartphone as sensed by the smart worn device.

10. A method as in claim 1 wherein the confidence scoring circuitry is constructed and arranged to output a series of confidence scores which includes the confidence score; and wherein the method further comprises:

applying a set of policies to the sequence of confidence scores to generate a set of policy decisions, the set of policy decisions controlling a set of resource access privileges.

11. A method as in claim 10 wherein applying the set of policies to the sequence of confidence scores includes:

performing an authentication operation that provides an authentication result, the user of the smartphone being granted access to the set of resource access privileges when the authentication result indicates successful authentication, and the user of the smartphone being denied access to the set of resource access privileges when the authentication result indicates unsuccessful authentication.

12. A method as in claim 11 wherein applying the set of policies to the sequence of confidence scores further includes:

after the authentication operation is performed and after the authentication result indicates success authentication, performing a de-authentication operation that provides a de-authentication result, the user of the smartphone being granted continued access to the set of resource access privileges when the de-authentication result indicates successful authentication, and the user of the smartphone being denied access to the set of resource access privileges when the de-authentication result indicates unsuccessful authentication.

13. Electronic circuitry, comprising:

memory; and processing circuitry coupled to the memory, the memory storing instructions which, when carried out by the processing circuitry, cause the processing circuitry to:
receive first activity data from a mobile device, the first activity data identifying activity by a user that is currently using the mobile device;
receive second activity data from an electronic wearable apparatus, the second activity data identifying physical activity by a wearer that is currently wearing the electronic wearable apparatus; and
based on the first activity data received from the mobile device and the second activity data received from the electronic wearable apparatus, perform an assessment operation that provides an assessment result indicating whether the user that is currently using the mobile device and the wearer that is currently wearing the electronic wearable apparatus are the same person;

wherein the mobile device is a smartphone, and the user is currently using the smartphone;

wherein the electronic wearable apparatus is a smart worn device, and the wearer is currently wearing the smart worn device;

wherein the processing circuitry, when performing the assessment operation, is constructed and arranged to identify an amount of correlation between the activity by the user and the physical activity by the wearer;

wherein the processing circuitry includes confidence scoring circuitry;

wherein the processing circuitry, when identifying the amount of correlation between the activity by the user and the physical activity by the wearer, is constructed and arranged to:
provide, by the confidence scoring circuitry, a confidence score that indicates a numerical measure of confidence that the user and the wearer are the same person;

wherein the processing circuitry further includes hand identification circuitry which is coupled to the confidence scoring circuitry; and wherein the processing circuitry, when identifying the amount of correlation between the activity by the user and the activity by the wearer, is constructed and arranged to:
provide, by the hand identification circuitry, hand identification data to the confidence scoring circuitry, the hand identification data being based on the first activity data and the second activity data and indicating one of: (i) the smartphone and the smart worn device residing at the same hand of the same person, (i) the smartphone and the smart worn device residing at both hands of the same person, (iii) the smartphone and the smart worn device residing at opposite hands of the same person, and (iv) unknown.

14. Electronic circuitry as in claim 13 wherein the mobile device is a smartphone, and the user is currently using the smartphone;

wherein the smart worn device is a smart wrist-worn device; and wherein the processing circuitry, when performing the assessment operation, is constructed and arranged to identify an amount of correlation between the activity by the user and the physical activity by the wearer.

15. Electronic circuitry as in claim 14 wherein the processing circuitry further includes motion correlation circuitry which is coupled to the confidence scoring circuitry, and input correlation circuitry which is coupled to the confidence scoring circuitry;

wherein the motion correlation circuitry provides a motion correlation score to the confidence scoring circuitry, the motion correlation score being based on the first activity data and the second activity data and indicating a numerical measure of correlation between motion of the smartphone and motion of the smart wrist-worn device; and wherein the input correlation circuitry provides an input correlation score to the confidence scoring circuitry, the input correlation score being based on the first activity data and the second activity data and indicating a numerical measure of correlation between input entered into the smartphone as sensed by the smartphone and input entered into the smartphone as sensed by the smart wrist-worn device.

16. Electronic circuitry as in claim 15 wherein the confidence scoring circuitry is constructed and arranged to output a series of confidence scores which includes the confidence score; and wherein the processing circuitry further includes authentication circuitry that (i) performs an authentication operation that provides an authentication result, the user of the smartphone being granted access to the set of resource access privileges when the authentication result indicates successful authentication, and the user of the smartphone being denied access to the set of resource access privileges when the authentication result indicates unsuccessful authentication, and (ii) after the authentication operation is performed and after the authentication result indicates success authentication, performs a de-authentication operation that provides a de-authentication result, the user of the smartphone being granted continued access to the set of resource access privileges when the de-authentication result indicates successful authentication, and the user of the smartphone being denied access to the set of resource access privileges when the de-authentication result indicates unsuccessful authentication.

17. A computer program product having a non-transitory computer readable medium which stores a set of instructions to perform a security operation, the set of instructions, when carried out by computerized circuitry, causing the computerized circuitry to perform a method of:

receiving first activity data from a mobile device, the first activity data identifying physical activity by a user that is currently using the mobile device;

receiving second activity data from an electronic wearable apparatus, the second activity data identifying physical activity by a wearer that is currently wearing the electronic wearable apparatus; and based on the first activity data received from the mobile device and the second activity data received from the electronic wearable apparatus, performing an assessment operation that provides an assessment result indicating whether the user that is currently using the mobile device and the wearer that is currently wearing the electronic wearable apparatus are the same person;

wherein the mobile device is a smartphone, and the user is currently using the smartphone;

wherein the electronic wearable apparatus is a smart worn device, and the wearer is currently wearing the smart worn device;

wherein performing the assessment operation includes identifying an amount of correlation between the activity by the user and the physical activity by the wearer;

wherein the computerized circuitry includes confidence scoring circuitry;

wherein identifying the amount of correlation between the activity by the user and the physical activity by the wearer includes:

providing, by the confidence scoring circuitry, a confidence score that indicates a numerical measure of confidence that the user and the wearer are the same person;

wherein the computerized circuitry further includes hand identification circuitry which is coupled to the confidence scoring circuitry; and wherein identifying the amount of correlation between the activity by the user and the activity by the wearer further includes:

providing, by the hand identification circuitry, hand identification data to the confidence scoring circuitry, the hand identification data being based on the first activity data and the second activity data and indicating one of: (i) the smartphone and the smart worn device residing at the same hand of the same person, (i) the smartphone and the smart worn device residing at both hands of the same person, (iii) the smartphone and the smart worn device residing at opposite hands of the same person, and (iv) unknown.

18. A method as in claim 1 wherein the assessment result indicates poor correlation between motion of the smartphone and motion of the smart worn device; and wherein the method further comprises:

preventing the user from accessing a protected electronic resource of the smartphone in response to the assessment result indicating poor correlation between the motion of the smartphone and the motion of the smart worn device.

19. A method of performing a security operation, the method comprising:

receiving, by processing circuitry, first activity data from a mobile device, the first activity data identifying activity by a user that is currently using the mobile device;

receiving, by the processing circuitry, second activity data from an electronic wearable apparatus, the second activity data identifying physical activity by a wearer that is currently wearing the electronic wearable apparatus; and based on the first activity data received from the mobile device and the second activity data received from the electronic wearable apparatus, performing, by the processing circuitry, an assessment operation that provides an assessment result indicating whether the user that is currently using the mobile device and the wearer that is currently wearing the electronic wearable apparatus are the same person;

wherein the mobile device is a smartphone, and the user is currently using the smartphone;

wherein the electronic wearable apparatus is a smart worn device, and the wearer is currently wearing the smart worn device; and wherein performing the assessment operation includes identifying an amount of correlation between the activity by the user and the physical activity by the wearer;

wherein the confidence scoring circuitry is constructed and arranged to output a series of confidence scores which includes the confidence score;

wherein the method further comprises:

applying a set of policies to the sequence of confidence scores to generate a set of policy decisions, the set of policy decisions controlling a set of resource access privileges;

wherein applying the set of policies to the sequence of confidence scores includes:

performing an authentication operation that provides an authentication result, the user of the smartphone being granted access to the set of resource access privileges when the authentication result indicates successful authentication, and the user of the smartphone being denied access to the set of resource access privileges when the authentication result indicates unsuccessful authentication; and wherein applying the set of policies to the sequence of confidence scores further includes:

after the authentication operation is performed and after the authentication result indicates success authentication, performing a de-authentication operation that provides a de-authentication result, the user of the smartphone being granted continued access to the set of resource access privileges when the de-authentication result indicates successful authentication, and the user of the smartphone being denied access to the set of resource access privileges when the de-authentication result indicates unsuccessful authentication.

20. A method of performing a security operation, the method comprising:
   receiving, by processing circuitry, first activity data from a mobile device, the first activity data identifying activity by a user that is currently using the mobile device;
   receiving, by the processing circuitry, second activity data from an electronic wearable apparatus, the second activity data identifying physical activity by a wearer that is currently wearing the electronic wearable apparatus; and
   based on the first activity data received from the mobile device and the second activity data received from the electronic wearable apparatus, performing, by the processing circuitry, an assessment operation that provides an assessment result indicating whether the user that is currently using the mobile device and the wearer that is currently wearing the electronic wearable apparatus are the same person;
   wherein the user is currently using the mobile device;
   wherein the wearer is currently wearing the electronic wearable apparatus;
   wherein performing the assessment operation includes identifying an amount of correlation between the activity by the user and the physical activity by the wearer; and
   wherein identifying the amount of correlation between the activity by the user and the physical activity by the wearer includes:
      providing hand identification data based on the first activity data and the second activity data and indicating one of: (i) the mobile device and the electronic wearable apparatus residing at the same hand of the same person, (i) the mobile device and the electronic wearable apparatus residing at both hands of the same person, (iii) the mobile device and the electronic wearable apparatus residing at opposite hands of the same person, and (iv) unknown.

* * * * *